(12) United States Patent
Kwon et al.

(10) Patent No.: US 9,457,333 B2
(45) Date of Patent: Oct. 4, 2016

(54) METHOD OF FORMING MICROSPHERE HAVING STRUCTURAL COLOR

(75) Inventors: Sunghoon Kwon, Seoul (KR); Hyoki Kim, Seoul (KR); Yadong Yin, Riverside, CA (US); Jianping Ge, Shanghai (CN)

(73) Assignee: SNU R&DB FOUNDATION, Seoul (KR)

( * ) Notice: Subject to any disclaimer, the term of this patent is extended or adjusted under 35 U.S.C. 154(b) by 7 days.

(21) Appl. No.: 13/271,668

(22) Filed: Oct. 12, 2011
(Under 37 CFR 1.47)

(65) Prior Publication Data
US 2012/0326104 A1    Dec. 27, 2012

Related U.S. Application Data (63) Continuation-in-part of application No. PCT/KR2010/002302, filed on Apr. 14, 2010.

(60) Provisional application No. 61/169,260, filed on Apr. 14, 2009.

(51) Int. Cl.
| | |
|---|---|
| *C09K 9/00* | (2006.01) |
| *G02F 1/00* | (2006.01) |
| *B01J 19/12* | (2006.01) |

(Continued)

(52) U.S. Cl.
CPC ............... *B01J 19/12* (2013.01); *B82Y 20/00* (2013.01); *B82Y 25/00* (2013.01); *C09C 1/24* (2013.01); *C09D 7/1225* (2013.01); *C09D 7/1283* (2013.01); *C09D 11/50* (2013.01); *G02B 1/005* (2013.01); *G02B 5/201* (2013.01); *G02F 1/09* (2013.01); *G02F 1/29* (2013.01); *H01F 1/0063* (2013.01); *C01P 2006/42* (2013.01); *C08K 3/22* (2013.01); *C08K 9/08* (2013.01);

(Continued)

(58) Field of Classification Search
USPC ...... 156/241; 235/449, 493; 252/62.54, 583; 264/1.36, 1.38, 427; 335/284; 427/550; 428/195.1; 506/9, 39; 977/773, 779, 977/904, 952
See application file for complete search history.

(56) References Cited

U.S. PATENT DOCUMENTS

2013/0105581 A1 *    5/2013    Kwon et al. ............. 235/449

FOREIGN PATENT DOCUMENTS

| KR | 10-2004-0081103 A | 9/2004 |
|---|---|---|
| KR | 10-2004-0086256 A | 10/2004 |

(Continued)

OTHER PUBLICATIONS

Jianping Ge, Howon Lee, Le He, Junhoi Kim, Zhenda Lu, Hyoki Kim, James Goebl, Sunghoon Kwon, and Yadong Yin, Magnetochromatic Microspheres: Rotating Photonic Crystals, J. Am. Chem. Soc. 2009, 131, 15687-15694. 2009. American Chemical Society.*

(Continued)

*Primary Examiner* — Bijan Ahvazi
(74) *Attorney, Agent, or Firm* — Paratus Law Group, PLLC (57) ABSTRACT

Provided is a method of forming a microsphere having a structural color, which includes providing a composition for generating a structural color including a curable material and magnetic nanoparticles dispersed in the curable material, forming an emulsion by adding the composition for generating a structural color to an immiscible solvent, arranging the magnetic nanoparticles located in the emulsion droplet of the curable material in a one-dimensional chain structure by applying a magnetic field to the emulsion, and fixing the chain structure by curing the emulsion droplet.

12 Claims, 10 Drawing Sheets
(7 of 10 Drawing Sheet(s) Filed in Color)

(51) Int. Cl.
| | |
|---|---|
| *B82Y 20/00* | (2011.01) |
| *B82Y 25/00* | (2011.01) |
| *C09C 1/24* | (2006.01) |
| *C09D 7/12* | (2006.01) |
| *C09D 11/50* | (2014.01) |
| *G02B 1/00* | (2006.01) |
| *G02B 5/20* | (2006.01) |
| *H01F 1/00* | (2006.01) |
| *G02F 1/09* | (2006.01) |
| *G02F 1/29* | (2006.01) |
| *B29D 11/00* | (2006.01) |
| *G02B 1/12* | (2006.01) |
| *C08K 3/22* | (2006.01) |
| *C08K 9/08* | (2006.01) |
| *H01F 1/34* | (2006.01) |

(52) U.S. Cl.
CPC ......... *G02B2207/101* (2013.01); *H01F 1/344* (2013.01); *Y10T 428/24802* (2015.01)

(56) References Cited

FOREIGN PATENT DOCUMENTS

| | | |
|---|---|---|
| WO | WO 2009/017525 | 2/2009 |
| WO | WO 2009/017525 A2 * | 2/2009 |

OTHER PUBLICATIONS

Jianping Ge, Yongxing Hu, Tierui Zhang, and Yadong Yin, Superparamagnetic Composite Colloids with Anisotropic Structures,J. Am. Chem. Soc. 2007, 129, 8974-8975. © 2007 American Chemical Society.*

Jianping Ge and Yadong Yin, Magnetically Tunable Colloidal Photonic Structures in Alkanol Solutions, Adv. Mater. 2008, 20, 3485-3491, 2008 WILEY-VCH Verlag GmbH & Co. KGaA, Weinheim.*

Dae Kun Hwang, Dhananjay Dendukuri and Patrick S. Doyle, Microfluidic-based synthesis of non-spherical magnetic hydrogel microparticles, Lab Chip, 2008, 8, 1640-1647, This journal is © The Royal Society of Chemistry 2008.*

Gira Yi, Photonic Crystals for Controlling the Light, Nice, 2005, pp. 446-455, vol. 23, No. 4.

Korean Intellectual Property Office, International Search Report for International Application No. PCT/KR2010/002302, Dec. 13, 2010.

Jianping Ge et al., "Magnetically Tunable Colloidal Photonic Structures in Alkanol Solutions", Advanced Materials, 2008, pp. 3485-3491, vol. 20.

Jianping Ge et al., "Highly Tunable Superparamagnetic Colloidal Photonic Crystals", Angewandte Chemic International Edition, 2007, pp. 7428-7431, vol. 46.

Jianping Ge et al., "Superparamagnetic Composite Colloids with Anisotropic Structures", Journal of the American Chemical Society, 2007, pp. 8974-8975, vol. 129.

Xiangling Xu et al., "Mesescopic Monodisperse Ferromagnetic Colloids Enable Magnetically . . . ", Journal of the American Chemical Society, 2002, pp. 13864-13868, vol. 124.

Jun Hyuk Moon et al., "Colloidal Engineering for Nano-Bio Fusion Research", Korean Chem. Eng. Res., Aug. 2008, pp. 647-659, vol. 46, No. 4.

Chih-Kai Huang et al., "Magnetic SiO2/Fe3O4 colloidal crystals", Nanotechnology 19, 2008, 055701 (5pp), IOP Publishing Ltd.

Xiangling Xu et al., "Superparamagnetic Photonic Crystals" Advanced Materials, Nov. 16, 2001, pp. 1681-1684, vol. 13, No. 22.

Vinayak Rastogi et al., "Synthesis of Light-Diffracting Assemblies from Microspheres and Nanoparticles in Droplets on . . . ", Advanced Materials, 2008, pp. 4263-4268, vol. 20.

Orlin D. Velev et al., "A Class of Microstructured Particles Through Colloidal Crystallization", Science, Mar. 24, 2000, pp. 2240-2243, vol. 287.

Byron Gates et al, "Photonic Crystals That Can Be Addressed with an External Magnetic Field", Advanced Materials, Nov. 2, 2001, pp. 1605-1608, vol. 13, No. 21.

Benjamin T. A. Chang et al., "CARIVERSE Resin: A Thermally Reversible Network Polymer for Electronic . . . ", Electronic Components and Technology Conference, 1999, pp. 49-55.

* cited by examiner

METHOD OF FORMING MICROSPHERE HAVING STRUCTURAL COLOR

TECHNICAL FIELD

The described technology relates generally to a method of forming a microsphere having a structural color.

BACKGROUND

Photonic crystal materials with a band gap property responsive to external stimuli have important applications in bio- and chemical sensors, color paints and inks, reflective display units, optical filters and switches, and many other active optical components. Colloidal crystals, which can be produced conveniently by self-assembling uniform colloidal particles, have been particularly useful for making responsive photonic materials because active components can be incorporated into the crystalline lattice during or after the assembly process. The majority of research in the field therefore has been focused on tuning the photonic properties of colloidal systems through changes in the refractive indices, lattice constants, or spatial symmetry of the colloidal arrays upon the application of external stimuli, such as chemical change, temperature variation, mechanical forces, electrical or magnetic fields, or light. However, wide use of these systems in practical applications is usually hampered by slow and complicated fabrication processes, limited tunability, slow response to the external stimuli, and difficulty of device integration.

Because the photonic band gap is highly dependent on the angle between the incident light and lattice planes, an alternative route to tunable photonic materials is to use external stimuli to change the orientation of a photonic crystal. For easy fabrication, actuation, and broader applications, it is highly desirable that the photonic crystals can be divided into many smaller parts whose orientation can be controlled individually or collectively as needed by using external stimuli. Photonic crystal microspheres, or "opal balls", have been previously demonstrated by Velev et al. in a number of pioneering works by using monodisperse silica or polystyrene beads as the building blocks (Velev, O. D.; Lenhoff, A. M.; Kaler, E. W. Science 2000, 287, 2240-2243; Rastogi, V.; Melle, S.; Calderon, O. Ci; Garcia, A. A.; Marquez, M.; Velev, O. D. Adv. Mater. 2008, 20, 4263-4268). The brilliant colors associated with these three dimensional periodic structures, however, cannot be tuned due to lack of control over the orientation of the microspheres. Xia et al. have introduced magnetic components into a photonic microcrystal so that its diffraction can be changed by rotating the sample using external magnetic fields (Gates, B.; Xia, Y. Adv. Mater. 2001, 13, 1605-1608). However, it has not been demonstrated that one can synthesize multiple copies of such microphotonic crystals, align them synchronically, and collectively output uniform color signals.

SUMMARY

In one embodiment, a method of forming a microsphere having a structural color is provided. The method includes: providing a composition for generating a structural color including a curable material and magnetic nanoparticles in the curable material; adding the composition for generating a structural color to an immiscible solvent to form an emulsion; applying a magnetic field to the emulsion to align the magnetic nanoparticles located in an emulsion droplet of the curable material in one-dimensional chain structures; and curing the emulsion droplet to fix the chain structures and form the microsphere.

In another embodiment, a microsphere having a structural color is provided. The microsphere includes a solid matrix; and the magnetic nanoparticles aligned in one-dimensional chain structures to exhibit a structural color within the solid matrix.

In yet another embodiment, a method of forming a microsphere having a structural color is provided. The method includes: A method of forming a microsphere having a structural color comprising: applying a magnetic field to an emulsion system including superparamagnetic nanoparticles to form an ordered structure of the superparamagnetic nanoparticles; and applying the magnetic field and simultaneously irradiating UV rays to the emulsion to fix the ordered structure and form the microsphere. Here, the emulsion system includes droplets of a photocurable resin containing the superparamagnetic nanoparticles and an immiscible solvent in which the droplets are dispersed.

In still another embodiment, A display device comprising a microsphere rotated by an external magnetic field is provided. Here, the microsphere contains an ordered structure of a photonic crystal due to the alignment of the magnetic nanoparticles, and a diffraction angle of light passing through the microsphere is changed with rotation of the microsphere The Summary is provided to introduce a selection of concepts in a simplified form that are further described below in the Detailed Description. The Summary is not intended to identify key features or essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other features and advantages of the present disclosure will become more apparent to those of ordinary skill in the art by describing in detail example embodiments thereof with reference to the attached drawings in which:

FIG. 10(*a*) illustrates dark-field optical microscopy images of a series of $Fe_3O_4@SiO_2$/PEGDA microspheres with diameters from approximately 150 to 4 µm, and wherein the larger microspheres were fabricated in mineral oil and smaller ones in silicone oil;

FIGS. 10(*b*)-10(*d*) are top view to side view SEM images of the microspheres, showing some of the $Fe_3O_4@SiO_2$ particle chains aligned on the surface along the longitudinal direction, and wherein it should be noted that a plurality of particle chains are embedded inside the microspheres, with only ends occasionally observable in the top view image (b);

DETAILED DESCRIPTION

It will be readily understood that the components of the present disclosure, as generally described and illustrated in the Figures herein, could be arranged and designed in a wide variety of different configurations. Thus, the following more detailed description of the embodiments of apparatus and methods in accordance with the present disclosure, as represented in the Figures, is not intended to limit the scope of the disclosure, as claimed, but is merely representative of certain examples of embodiments in accordance with the disclosure. The presently described embodiments will be best understood by reference to the drawings, wherein like parts are designated by like numerals throughout. Moreover, the drawings are not necessarily to scale, and the size and relative sizes of the layers and regions may have been exaggerated for clarity.

As used in the description herein and throughout the claims, the following terms take the meanings explicitly associated herein, unless the context, clearly dictates otherwise: the meaning of "a", "an", and "the" includes plural reference, the meaning of "in" includes "in" and "on". It will also be understood that when an element or layer is referred to as being "on" another element or layer, the element or layer may be directly on the other element or layer or intervening elements or layers may be present. As used herein, the term "and/or" may include any and all combinations of one or more of the associated listed items.

In accordance with an exemplary embodiment, a method of forming a microsphere having a structural color is provided. First, a composition for generating a structural color including a curable material and magnetic nanoparticles dispersed in the curable material is provided.

Subsequently, the composition for generating a structural color is added to an immiscible solvent to form an emulsion. A spherical particle may be prepared using the composition for generating a structural color. When the composition for generating a structural color is mechanically stirred in an immiscible solvent which is not easily mixed with the composition and phase-separated, the composition for generating a structural color forms a spherical droplet and may be emulsified. As an example, the immiscible solvent may be a non-polar solvent with high viscosity. For emulsification, a surfactant and/or cosurfactant may be added.

Subsequently, the magnetic nanoparticles located in the emulsion droplet of the curable material are aligned in one-dimensional chain structures by applying a magnetic field to the emulsion. When the magnetic field is applied to a stirred solution of the emulsified composition for generating a structural color, the magnetic nanoparticles in the emulsified composition for generating a structural color are aligned in one-dimensional chain structures. With the magnetic field strength, inter-particle spacing between the magnetic nanoparticles may be changed, and therefore a wavelength of diffracted light may be tuned.

Subsequently, a microsphere having a structural color may be formed by curing the emulsion droplet to fix the chain structures. The curing may be performed by exposing the curable material to UV rays. The structural color may be continuously maintained through the fixation. The curable material may include a monomer or oligomer containing a crosslinkable site. The microsphere contains an ordered structure of a photonic crystal due to the alignment of the magnetic nanoparticles, and a diffraction angle of light passing through the microsphere may be changed with rotation of the microsphere. The chain structures may generate a first color by forming the ordered structure of the photonic crystal. In addition, the method of forming the microsphere may further include a process of changing the first color into a second color by changing the diffraction angle of light passing through the microsphere by rotating the microsphere.

The method of forming the microsphere may further include a process of dispersing the microspheres in a phase-changeable matrix. The phase-changeable matrix may have a liquid phase and a solid phase. If the phase-changeable matrix is in a liquid phase, an orientation of the microsphere may be changed by adjusting an angle of the external magnetic field. As the phase-changeable matrix is changed into a solid phase by the solidifying procedure, the orientation of the microspheres may be fixed. For example, after the microspheres prepared by the above method are dispersed in a thermoplastic resin maintained in a liquid phase at a high temperature, a magnetic field is applied to exhibit a structural color, and the thermoplastic resin is solidified by lowering the temperature, then the orientation of the microspheres may be fixed in a solid matrix. Examples of the phase-changeable matrix may include a material which can be reversibly switched between a liquid phase and a solid phase, such as paraffin, long-chain alkane, primary alcohol, polyethylene, polyethyleneglycol, polyethylene-block-polyethyleneglycol copolymer and polyester.

In accordance with an exemplary embodiment, magnetochromatic microspheres can be fabricated through instant assembly of superparamagnetic photonic crystals inside emulsion droplets of UV curable resin followed by an immediate UV curing process to polymerize the droplets and fix the ordered structures. When dispersed in the liquid droplets, superparamagnetic $Fe_3O_4@SiO_2$ core-shell particles self-organize under the balanced interaction of repulsive and attractive forces to form one-dimensional chains, each of which contains periodically arranged particles diffracting visible light and displaying field-tunable colors. UV initiated polymerization of the oligomers of the resin fixes the periodic structures inside the droplet microspheres and retains the diffraction property. Because the superparamagnetic chains tend to align themselves along the field direction, it is very convenient to control the orientation of such photonic microspheres and accordingly, their diffractive colors, by changing the orientation of the crystal lattice relative to the incident light using magnetic fields.

It can be appreciated that among potential external stimuli, a magnetic field has the benefits of contactless control, instant action, and easy integration into electronic devices, though it has only been used limitedly in assembling and tuning colloidal crystals due to the complication of the forces that are involved. In accordance with an exemplary embodiment, a series of magnetically tunable photonic crystal systems have been developed through the assembly of uniform superparamagnetic particles in liquid media with an exemplary embodiment, the assembly of such photonic crystals includes the establishment of a balance between the magnetically induced dipolar attraction and the repulsions resulted from surface charge or other structural factors such as the overlap of solvation layers. This finely tuned dynamic equilibrium leads to the self-assembly of the magnetic colloids in the form of chain structures with defined internal periodicity along the direction of external field, and also renders the system fast, fully reversible optical response across the visible-near-infrared range when the external magnetic field is manipulated.

The method of forming the microsphere may include a procedure of changing a structural color of the microsphere by rotating the microsphere using an external magnetic field. It can be appreciated that unlike "opal balls" whose orientation cannot be controlled, fixing of photonic crystals chains makes the microspheres magnetically "polarized" so that their orientation becomes fully tunable as chains of the superparamagnetic nanoparticles always tend to align along the external magnetic field direction. In addition, it can be appreciated that multiple copies of photonic crystal microspheres can be fabricated in single process, and their orientation can be synchronically tuned to collectively display a uniform color.

It can be appreciated that the photonic microsphere system as disclosed does not involve the nanoparticle assembly step, and therefore has several advantages. These advantages include long-term stability of optical response, improved tolerance to environmental variances such as ionic strength and solvent hydrophobicity, and greater convenience for incorporation into many liquid or solid matrices without the need of complicated surface modification. For example, in accordance with an exemplary embodiment, it can be appreciated that the magnetochromatic microspheres can be incorporated into a matrix, which can reversibly change between liquid and solid phases, to produce a switchable color display system whose color information can be switched "on" and "off" multiple times by means of an applied magnetic field.

The composition for generating a structural color may be emulsified in a solvent when the composition for generating a structural color is dispersed in an immiscible solvent and mechanically stirred. Here, the immiscible solvent may include a non-polar solvent and other solvents, which are not mixed with the composition for generating a structural color. Specifically, the immiscible solvent may be a solvent not reactive under photopolymerization condition such as silicone oil, mineral oil or paraffin oil.

The technique capable of modulating a kind of the structural color using the external magnetic field may be suitable for applications such as color display, data storage devices, anti-counterfeiting materials and sensors.

In accordance with an exemplary embodiment, a display device including a microsphere rotated with an external magnetic field is provided. Here, the microsphere may include an aligned structure of magnetic nanoparticles. In addition, with the rotation of the microsphere, a diffraction angle of light passing through the microsphere may be changed. In the display device, the microspheres may be dispersed in a phase-changeable matrix. When the phase-changeable matrix is in a liquid phase, the microspheres may be instantaneously rotated by adjusting a direction of the external magnetic field. And when the phase-changeable matrix is in a solid phase, the orientation of the microspheres may be fixed. So it can be appreciated that the display device having on/off bistable states can be fabricated by embedding the microspheres in a matrix that can thermally switch between solid and liquid phases.

Figure 1:
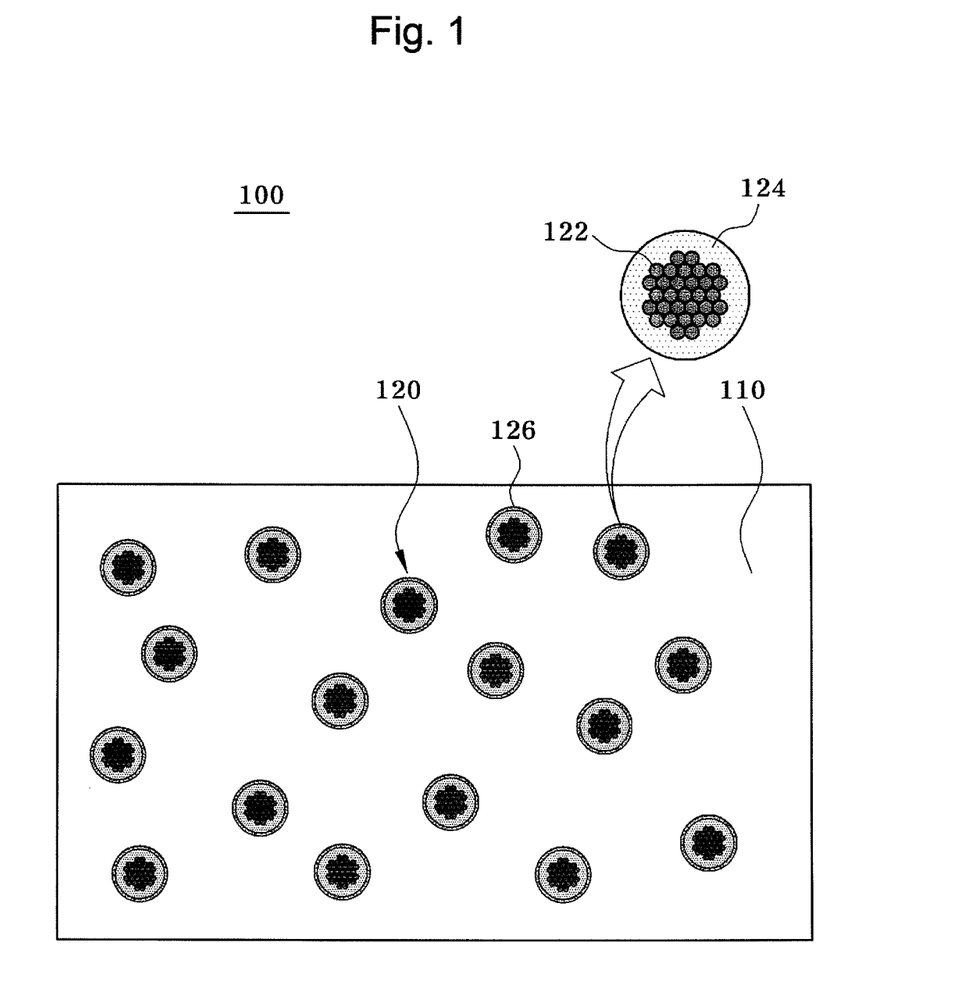
FIG. 1 is a diagram of a composition for generating a structural color in accordance with an exemplary embodiment.

Hereinafter, exemplary embodiments described in the specification will be described in detail with reference to drawings. FIG. 1 is a diagram of a composition for generating a structural color in accordance with an exemplary embodiment. Referring to FIG. 1, a composition for generating a structural color 100 may include a curable material 110 and magnetic nanoparticles 120 dispersed in the curable material 110.

The magnetic nanoparticles 120 may include a cluster 122 of magnetic nanocrystals. The size of the magnetic nanoparticles 120 may be several tens to hundreds of nanometers, and the size of the magnetic nanocrystals may be several to several tens of nanometers. Examples of the magnetic nanocrystals may include a magnetic materials or a magnetic alloys. The magnetic material or magnetic alloy may include at least one selected from the group consisting of Co, $Fe_2O_3$, $Fe_3O_4$, $CoFe_2O_4$, MnO, $MnFe_2O_4$, CoCu, CoPt, FePt, CoSm, NiFe and NiFeCo.

The magnetic nanoparticles 120 may be superparamagnetic nanoparticles including a superparamagnetic material. The superparamagnetic material has magnetism only in the presence of an external magnetic field, unlike a ferromagnetic material in which magnetism can be maintained without a magnetic field. Usually, when the particle size of a ferromagnetic material is several to several hundreds of nanometers, the ferromagnetic material may be phase-changed into a superparamagnetic material. For example, when iron oxide is the size of approximately 10 nm, it may have superparamagnetism.

In addition, the magnetic nanoparticles 120 may be, as shown in FIG. 1, coated with a shell layer 124 surrounding a core formed in the cluster 122 of magnetic nanocrystals. The shell layer 124 allows the magnetic nanoparticles 120 to be evenly distributed in the curable material 110. Furthermore, to be described later, the shell layer 124 may stimulate solvation repulsion on a surface of each magnetic nanoparticle 120 to offset potent magnetic attraction between the magnetic nanoparticles 120. For example, the shell layer 124 may include silica. When the shell layer 124 is surface-modified with silica, a known sol-gel process may be used.

In addition, the composition 100 for generating a structural color may further include a hydrogen bonding solvent. As the hydrogen bonding solvent, various alkanol solvents such as ethanol, isopropyl alcohol and ethylene glycol may be used. Also, a solvation layer 126 surrounding the magnetic nanoparticle 120 may be formed. For example, as the solvation layer 126 is formed due to an influence of a silanol (Si—OH) functional group on a surface of the shell layer 124 having silica, a repulsion force between the magnetic nanoparticles 120 may be induced. According to one exemplary embodiment, the shell layer 124 and/or the solvation layer 126 may not be present on the magnetic nanoparticles 120. In this case, an electrostatic force on the surface of the magnetic nanoparticles 120 may act as a repulsion force.

As the magnetic nanoparticles 120 are mixed with the curable material 110 and subjected to mechanical stirring or ultrasonic treatment, the composition 100 for generating a structural color may be prepared. The magnetic nanoparticles 120 may be included in the curable material 110 at a volume fraction of, for example, 0.01% to 20%. When the volume fraction of the magnetic nanoparticles 120 is less than 0.01%, reflectivity may be decreased, and when the volume fraction of the magnetic nanoparticles 120 is more than 20%, reflectivity may not be increased any more.

The curable material 110 may serve as a dispersion medium stably dispersing the magnetic nanoparticles 120 forming a photonic crystal. In addition, as the inter-particle distance between the magnetic nanoparticles 120 is fixed by crosslinking of the curable material 110, a certain structural color may be continuously maintained after a magnetic field is eliminated.

The curable material 110 may include a liquid-phase material such as a monomer, an oligomer or a polymer having a crosslinkable site for curing reaction. The curable material 110 may include a liquid-phase hydrophilic polymer capable of forming a hydrogel. A hydrophilic polymer is a polymer suitable for dispersing the magnetic nanoparticles 120 due to its hydrophilic groups. When the hydrophilic polymer is crosslinked by an appropriate energy source, thereby forming a hydrogel having a three-dimensional network structure, the magnetic nanoparticles 120 may be fixed.

Examples of the curable material 110 capable of forming a hydrogel may include a silicon-containing polymer, polyacrylamide, polyethylene oxide, polyethylene glycol diacrylate, polypropylene glycol diacrylate, polyvinylpyrrolidone, polyvinyl alcohol, polyacrylate or a copolymer thereof. For example, since the curable material 110, polyethylene glycol diacrylate (PEGDA), has an acrylate functional group at both terminal ends of polyethylene glycol (PEG), the curable material 110 may be crosslinked into a three-dimensional hydrogel via free radical polymerization. The curable material 110 may further include any type of medium which can be changed into a solid from a liquid.

The curable material 110 may further include an initiator, and the initiator may induce free radical polymerization by an external energy source. The initiator may be an azo-based compound or a peroxide. The curable material 110 may further include a proper crosslinking agent, for example, N,N'-methylenebisacrylamide, methylenebismethacrylamide, ethylene glycol dimethacrylate, etc. The magnetic nanoparticles 120 may be aligned in the curable material 110 to generate structural colors under an external magnetic field.

Figure 2:
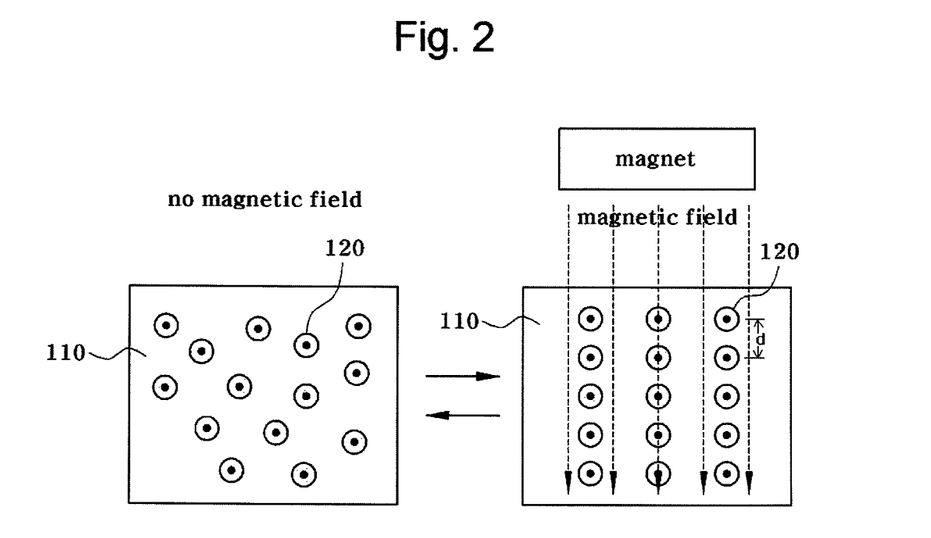
FIG. 2 is a diagram for explaining a principle of generating a structural color.

FIG. 2 is a diagram for explaining a principle of generating structural color. Referring to FIG. 2, when a magnetic field is not applied, the magnetic nanoparticles 120 are randomly dispersed in the curable material 110, but when a magnetic field is applied from a nearby magnet, the magnetic nanoparticles 120 may be aligned parallel to a direction of the magnetic field to form a photonic crystal, thereby emitting a structural color. The magnetic nanoparticles 120 aligned by the magnetic field may return to the non-aligned state when the magnetic field is eliminated. A photonic crystal is a material having a crystal structure capable of controlling light. Photons (behaving as waves) propagate through this structure—or not—depending on their wavelength. Wavelengths of light that are allowed to travel are known as modes, and groups of allowed modes form bands. Disallowed bands of wavelengths are called photonic band gaps. This gives rise to distinct optical phenomena such as inhibition of spontaneous emission, high-reflecting omni-directional mirrors and low-loss-waveguiding, amongst others. The magnetic nanoparticles 120 present in a colloidal state may have an attractive interaction therebetween in the curable material 110 due to the magnetism when a magnetic field is applied outside, and also have a repulsive interaction caused by an electrostatic force and a solvation force. By the balance between the attraction and the repulsion, the magnetic nanoparticles 120 are aligned at regular intervals, thereby forming a chain structure. Therefore, inter-particle distance d between the aligned magnetic nanoparticles 120 may be determined by the magnetic field strength. As the magnetic field is stronger, the inter-particle distance d between the magnetic nanoparticles 120 aligned along the direction of the magnetic field may be reduced. The inter-particle distance d may be several to several hundreds of nanometers with the magnetic field strength. With a lattice spacing in the photonic crystal is changed, the wavelength of reflected light may be changed according to Bragg's law. As the magnetic field strength is increased, a structural color of a shorter wavelength region may be generated. As a result, a wavelength of the reflected light may be determined by the strength of a specific magnetic field. Unlike the conventional photonic crystal reflected only at a certain wavelength, the photonic crystal may exhibit an optical response that is fast, extensive and reversible with respect to an external magnetic field. As the lattice spacing is changed with the variation in the nearby magnetic field, the reflective light with a specific wavelength may be induced from external incident light.

The structural color may be dependent on a size of the magnetic nanoparticle 120 as well as the magnetic field strength. For example, as $Fe_3O_4$ magnetic nanoparticle 120 with a silica shell is increased in size from approximately 120 nm to approximately 200 nm, the structural color may shift from blue to red. However, it can be appreciated that the color or the diffraction wavelength is determined by not only the magnetic nanoparticle size, the silica shell layer, and magnetic field strength, but also many other parameters such as the chemical nature of the curable material, the surface charge of the particle surface, and the additives.

Figure 3:
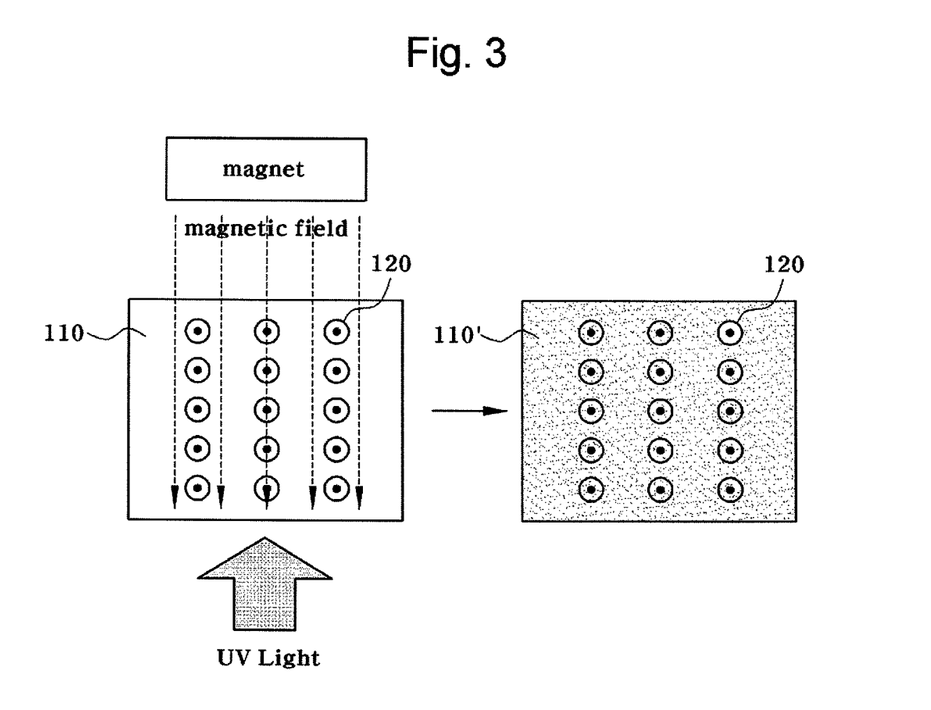
FIG. 3 is a diagram of a process of fixing a photonic crystal structure by curing a composition for generating a structural color.

FIG. 3 is a diagram illustrating a procedure of fixing a photonic crystal structure by curing a composition for generating a structural color. As shown in FIG. 3, when the composition 100 for generating a structural color including the curable material 110 and magnetic nanoparticles 120 is exposed to a magnetic field and UV rays are irradiated, a curing procedure progresses, thereby forming a solid medium 110'. As a result, a photonic crystal structure of the magnetic nanoparticles 120 may be fixed in the solid medium 110'. Thus, a colored product having a structural color may be formed by using the composition 100 for generating a structural color. The composition 100 for generating a structural color may be easily manufactured at a low cost, and exhibit reflected light with various wavelengths in the entire region of visible light.

Physical/chemical properties of the solid medium 110' may be modulated by changing molecular weight of the curable material 110, a concentration of an initiator, an irradiation time of UV rays, etc.

By the curing of the curable material 110, the solid medium 110' may be in the form of a crosslinked polymer. A spacing between chains of the crosslinked polymer having a network structure may be approximately 1 to several nanometers. Thus, provided that the conventional magnetic nanoparticles 120 can have a size of approximately 150 to 170 nm, the magnetic nanoparticles 120 may be easily fixed. As a solvation layer 126 is coated on a surface of the magnetic nanoparticles 120, the magnetic nanoparticles 120 are spaced apart in a regular distance.

By using the composition 100 for generating a structural color described above, a microsphere having a structural color may be formed. The magnetic nanoparticles 120 included in the microsphere having a structural color are arranged apart in a regular distance in a direction of at least one axis, thereby forming a chain structure. A wavelength of light diffracted from external incident light is determined by a size of the regular distance, and therefore the microspheres may exhibit a structural color.

Figure 4:
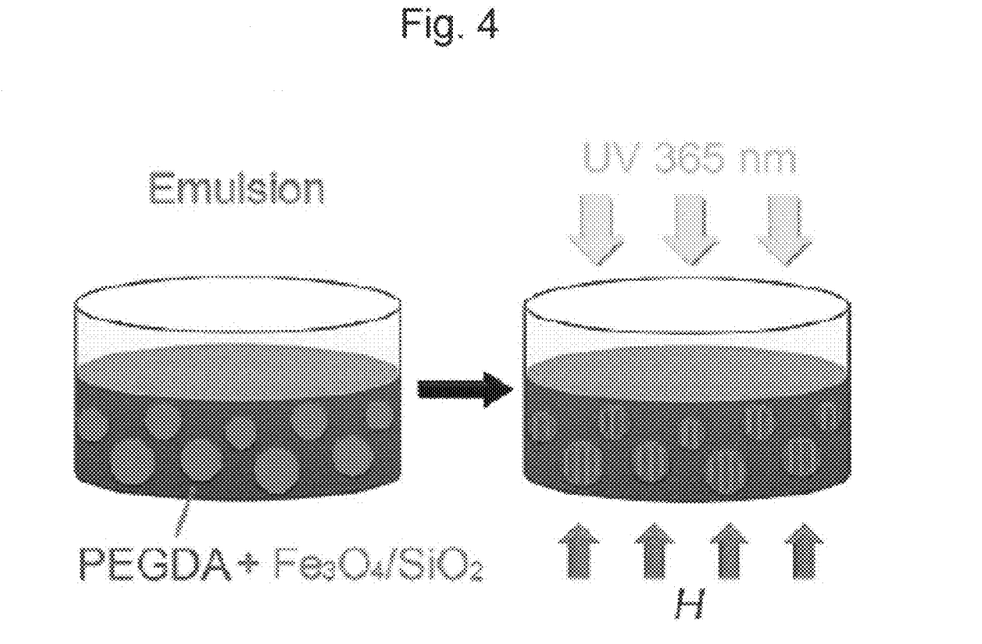
FIG. 4 is a schematic of a synthetic procedure for the magnetochromatic microspheres.

FIG. 4 is a schematic of a synthetic procedure for the magnetochromatic microspheres. In FIG. 4, a composition ($Fe_3O_4$@$SiO_2$/PEGDA) for generating a structural color may be used to synthesize the magnetochromatic microspheres. It can be appreciated that besides silica, titania and some polymer such as polystyrene and polymethylmethacrylate may be used as a shell layer. The thickness of the silica coating may be controlled by controlling the amount of silane precursors or the catalyst.

The silica coated $Fe_3O_4$ superparamagnetic particles may be dispersed in a liquid UV curable resin preferably containing mainly polyethyleneglycol diacrylate (PEGDA) oligomers and a trace amount of photoinitiator 2,2-Dimethoxy-2-phenylacetophenone (DMPA). It can be appreciated that other suitable photocurable resins may be used including but not limited to ethoxylated trimethylolpropane triacrylate (ETPTA), polyethyleneglycol diacrylate (PEGDA), 2-hydroxyethyl methacrylate (HEMA), methylmethacrylate (MMA), acrylamide (AAm), allylamine (AM) and/or any combination thereof. Alternatively, any medium capable of being converted from liquid to solid such that ordered structures of photonic crystals are fixed within may be used.

The $Fe_3O_4$/PEGDA mixtures are then dispersed in a viscous non-polar solvent (or immiscible liquid) such as silicone oil or mineral oil under mechanical stirring, which leads to the formation of an emulsion. It can be appreciated that besides silicone oil or mineral oil, the immiscible liquid may be paraffin oil or any oil immiscible liquid with the curable solution, and with appropriate density and inertness to polymerize.

Upon the application of an external magnetic field, the superparamagnetic particles self-assemble into ordered structures inside the emulsion droplets when the magnetically induced attraction reaches a balance with repulsive interactions including electrostatic and solvation forces.

In accordance with an exemplary embodiment, an immediate 365 nm UV illumination quickly polymerizes the PEGDA oligomers to transform the emulsion droplets into solid polymer microspheres, and at the same time permanently fixes the periodic superparamagnetic structures. It can be appreciated that any suitable photolithography setup with UV light preferably in the range of approximately 240 nm (DUV) to 365 nm (I-Line) may be used with this system to fix the photonic structures in the resin. In addition, instead of using traditional mask-defined beam patterning which usually requires mechanical movement of the physical mask, using the maskless lithography may enable high resolution patterning without any alignment error.

In accordance with an exemplary embodiment, microspheres with different colors may be obtained by controlling the periodicity of the superparamagnetic assembly through the variation of the external magnetic field during UV curing process. It can be appreciated that due to the short-range nature of the solvation force, the range of color that can be produced from a single $Fe_3O_4$/PEGDA mixture may be limited. However, in accordance with an exemplary embodiment, in order to produce microspheres with largely different colors such as red and blue, $Fe_3O_4$ particles with different initial sizes or with $SiO_2$ coatings of different thicknesses may be used. In accordance with an exemplary embodiment, the diameter of the microspheres typically is preferably in the range of approximately 1 μm to 300 μm, and more preferably approximately 10 μm to 100 μm, depending on the type of oil and the speed of mechanical stirring.

In accordance with an exemplary embodiment, the microspheres are preferably larger than 10 μm, which will present a consistent color, which is mainly contributed by the straight photonic chain structures inside the microsphere. However, it can be appreciated that microspheres smaller than 10 μm may used. Once made uniformly in size, it can be appreciated that each of the microspheres should display the same color with magnetic tunability.

Figure 5:
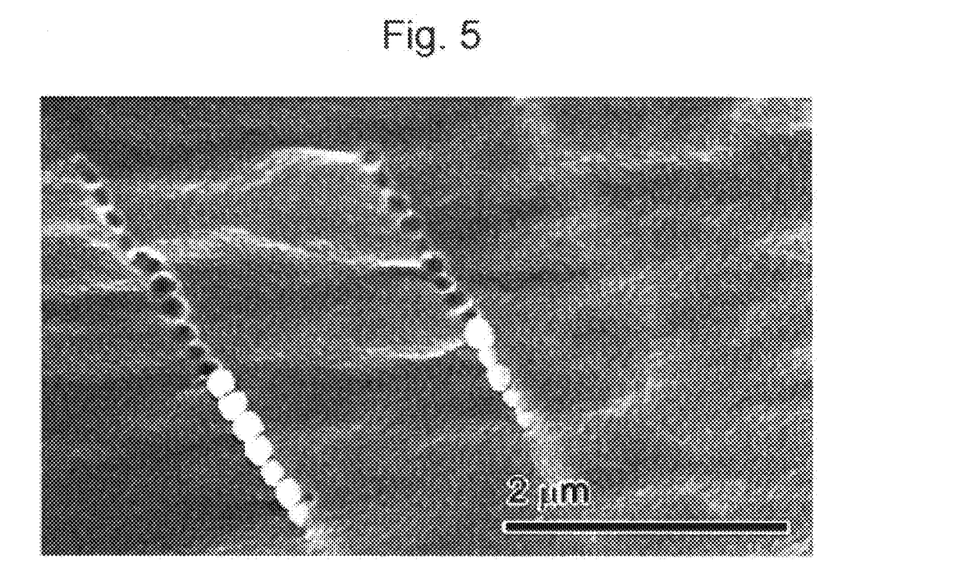
FIG. 5 is a scanning electron microscopy (SEM) image of $Fe_3O_4$ particles coated with $SiO_2$ embedded in a PEGDA medium.

When the magnetic field is applied, the superparamagnetic nanoparticles in the composition for generating a structural color may form a chain structure parallel to the direction of the external magnetic field. FIG. 5 is a scanning electron microscopy (SEM) image of $Fe_3O_4$ particles coated with $SiO_2$ embedded in a PEGDA medium. FIG. 5 shows a cross-section of, a spherical microsphere particle cut with a microtome. In FIG. 5, parallel particle chains with regular inter-particle spacing can be easily observed. It can be appreciated that the separation between neighboring chains is typically on the order of a few micrometers due to the strong inter-chain repulsion induced by the external field.

Figure 6:
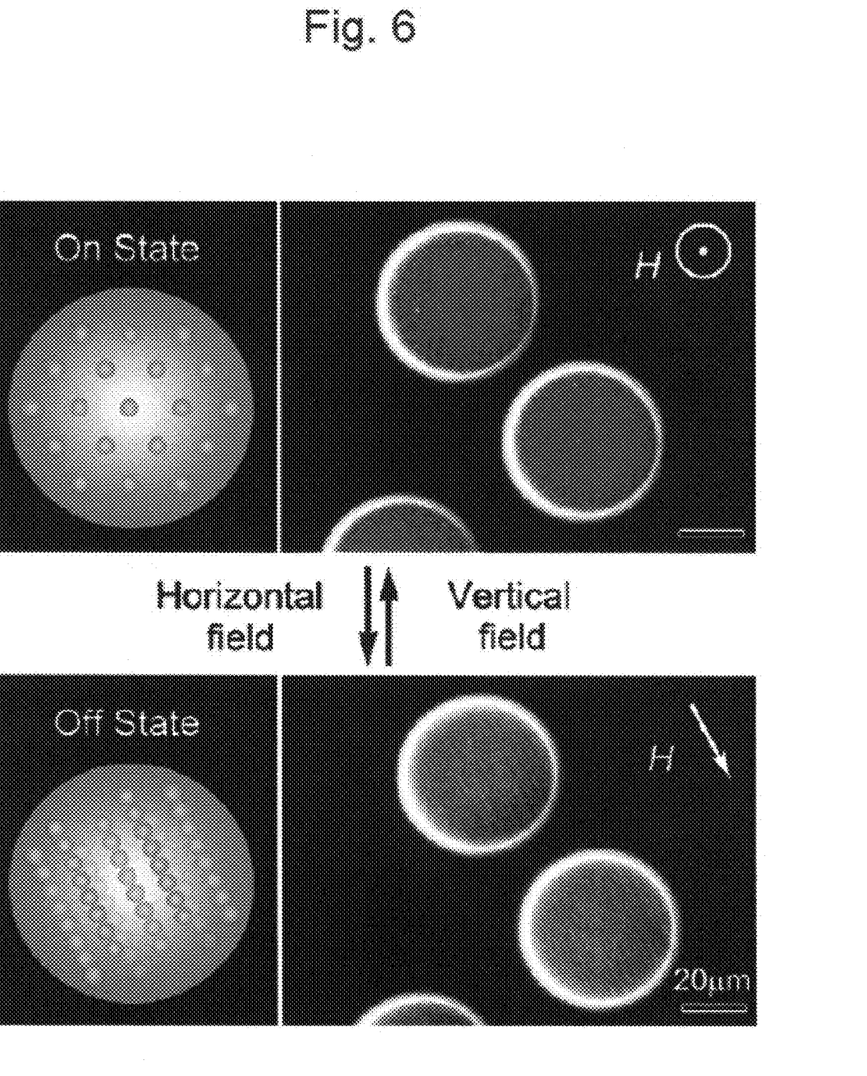
FIG. 6 shows schematic illustrations and optical microscopy images for the magnetochromatic effect caused by rotating the chain-like photonic structures in magnetic fields.

FIG. 6 shows schematic illustrations and optical microscopy images for the magnetochromatic effect caused by rotating the chain-like photonic structures in magnetic fields. Referring to FIG. 6, the diffraction of the microspheres dispersed in a liquid can be conveniently switched between "on" and "off" states by using the external magnetic field. In a vertical field, the particle chains stand straight so that their diffraction is turned "on" and the corresponding color can be observed from the top. Each bright green dot in the optical microscopy image actually represents one vertically aligned particle chain. On the contrary, when the field is switched horizontally, the microspheres are forced to rotate 90° to lay down the particle chains so that the diffraction is turned off and microspheres show the native brown color of iron oxide. It can be appreciated that the particle chains can be directly observed by careful inspection of the microspheres through microscopy. The rotation of the microspheres is instant, and synchronized with the natural movement of external fields.

Figure 7:
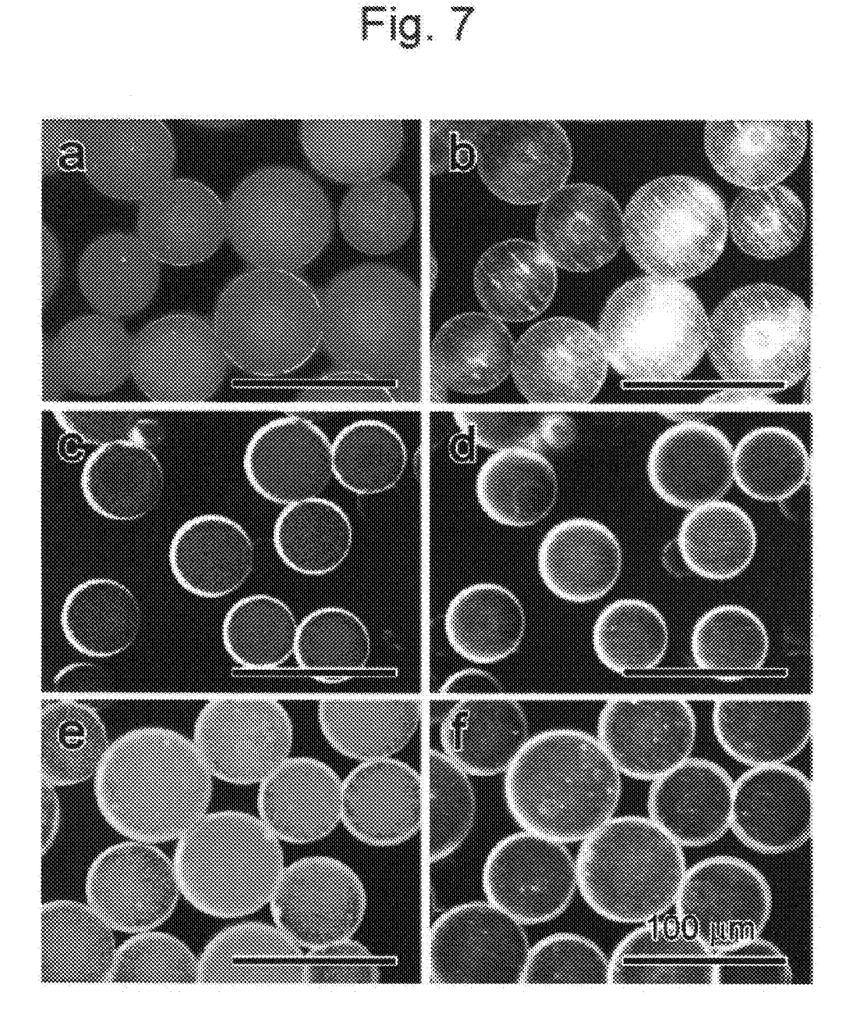
FIG. 7 illustrates optical microscopy images (500×) of magnetochromatic microspheres with diffractions switched between "on" (a, c, e) and "off" (b, d, f) states by using external magnetic fields, and wherein these microspheres were prepared using (a, b) 127, (c, d) 154, and (e, f) 197 nm $Fe_3O_4@SiO_2$ colloids.

FIG. 7 demonstrates the complete on/off switching of magnetochromatic microspheres that originally diffract blue, green and red light. These microspheres are synthesized by starting with superparamagnetic particles with average diameters of 127, 154, 197 nm. It can be appreciated that by mixing of RGB (Red, Green and Blue) microspheres in various ratios can produce a great number of colors that can be collectively perceived by human eyes.

According to a size of the superparamagnetic nanoparticles in the microsphere particle, a wavelength showing the maximum reflectivity is different. In the case of (a), the microsphere particle is blue, in the case of (c), the microsphere particle is green, and in the case of (e), the microsphere particle is red.

Figure 8:
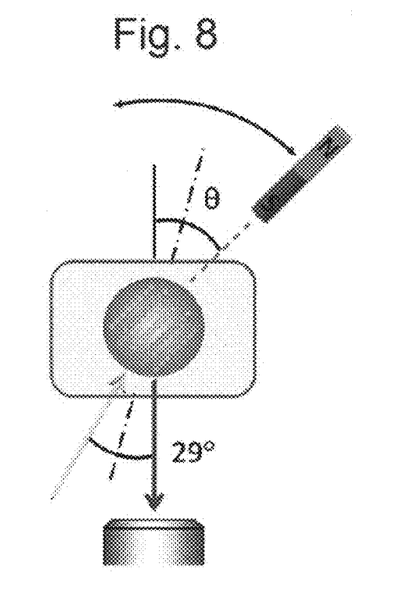
FIG. 8 is a schematic illustration of the experimental setup for studying the angular dependence of the diffraction property of the magnetochromatic microspheres.

FIG. 8 is a schematic illustration of the experimental setup for studying the angular dependence of the diffraction property of the magnetochromatic microspheres. Depending on the direction of the external magnetic field, the particle chains can be suspended at any intermediate stage between the on/off states with a specific tilting angle ($\theta$). While the magnetic field is tuned within the plane constructed by the incident light and back scattered light, the diffraction from an isolated microsphere is recorded correspondingly by the spectrometer, as schematically shown in FIG. 8.

Figure 9:
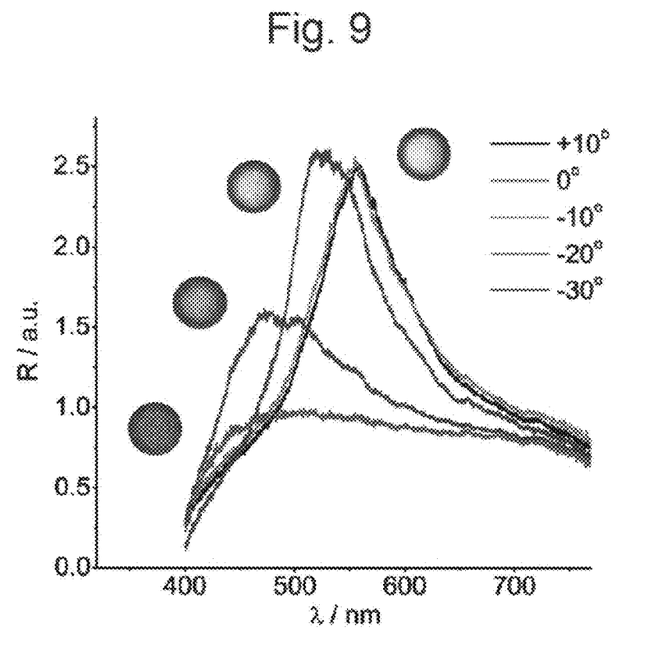
FIG. 9 is a reflection spectrum and corresponding digital photo recorded from a single $Fe_3O_4@SiO_2$/PEGDA microsphere at different tilting angles.

FIG. 9 is a reflection spectrum and corresponding digital photo recorded from a single $Fe_3O_4@SiO_2$/PEGDA microsphere at different tilting angles. In FIG. 9, the dependence of diffraction peak wavelength ($\lambda$) and intensity (R) on the tilting angle ($\theta$) using an optical microscope coupled with a spectrometer is shown. It can be appreciated that the diffraction peak blue-shifts with decreasing intensity when the magnetic field direction is manipulated away from the angular bisector of incident light and back scattered light ($\theta \approx 14.5°$). FIG. 9 shows the spectra and corresponding microscopy images when the angle $\theta$ is tilted from +10° to −30°. Such a change in the diffraction peak position and intensity closely resembles the characteristics of a one-dimensional Bragg photonic crystal, as proven by the close match between the experimental results and theoretical simulations. Beyond −30°, the diffraction intensity is very low so that the photonic state of the microsphere can be practically considered as "off".

In accordance with an exemplary embodiment, the average size of the microspheres can be controlled using the simple dispersing process through the choices of the oil type and the speed of mechanical stirring. It can be appreciated that several methods including those using microfluidic devices are available to produce monodispersed microdroplets. In general, using high speed stirring and viscous oils leads to the formation of smaller emulsion droplets. The microspheres prepared in mineral oils have average diameters above 50 μm, and those prepared in silicone oils have average diameters less than 30 μm.

Figure 10:
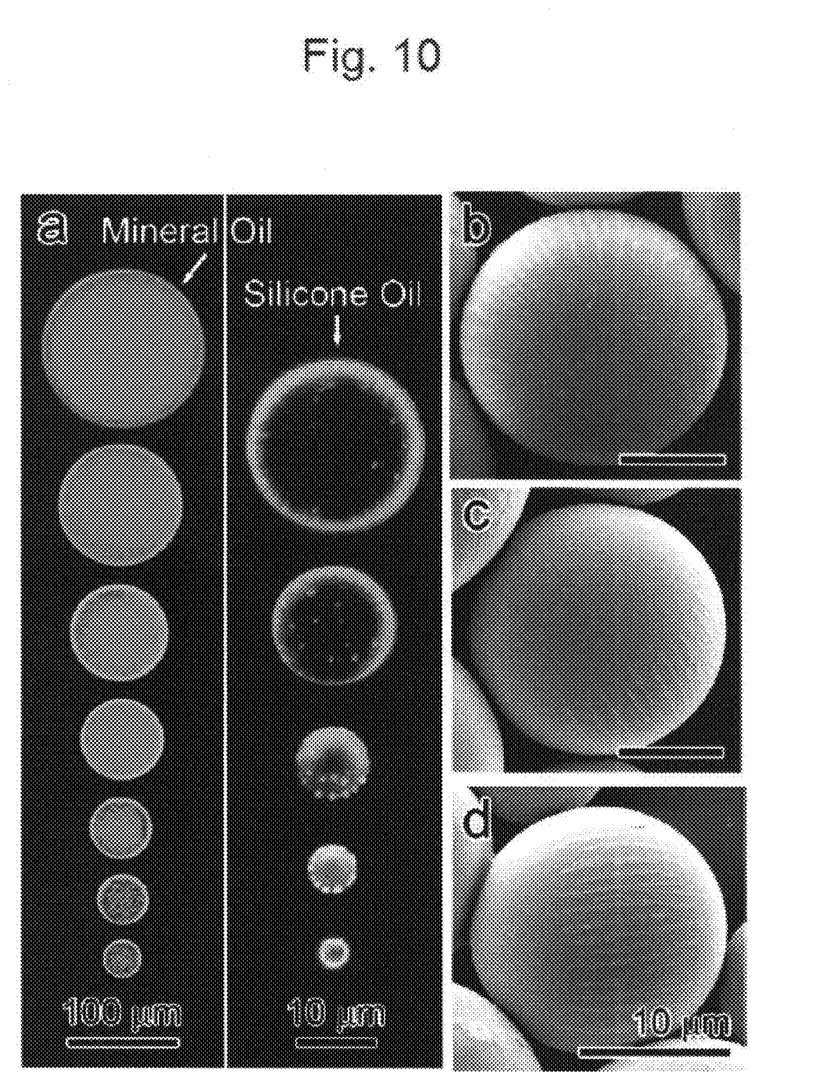

FIG. 10(a) illustrates dark-field optical microscopy images of a series of $Fe_3O_4@SiO_2$/PEGDA microspheres with diameters from approximately 150 to 4 μm, and wherein the larger microspheres were fabricated in mineral oil and smaller ones in silicone oil. Vertical external fields are applied so that these microspheres are all at the "on" state. Microspheres larger than 10 μm containing particle chains with spacing such that they reflect red light all display the expected red dots, which contribute to the overall production of red color, can be clearly observed inside the microspheres 10 μm and smaller containing similarly spaced particle chains, fewer red dots can be observed in the center. Instead, contribution of the diffraction from the edge to the overall color of the microspheres gradually increases, with a progressive blue-shift from orange to yellow and eventually yellow-green as the microsphere size is reduced. This phenomenon can be explained by the unique self-assembly behavior of superparamagnetic particles in the PEGDA droplets.

FIGS. 10(b)-(d) show the top-view and side-view SEM images of the typical microspheres, suggesting that the superparamagnetic particle chains are not only embedded inside the microspheres in the form of straight strings but also laid on the curved surface along the longitudinal direction. The "bent" assembly of superparamagnetic particles on the microsphere surface can be attributed to the combined effect of the spherical confinement of the emulsion droplets and the magnetically induced strong repulsive force perpendicular to the direction of the external field. The bent surface assemblies can be viewed as chains tilted from the vertical direction with the degree of tilting determined by the curvature of the microspheres. As the microspheres become smaller, the curvature becomes larger and tilting angle increases, leading to a blue-shift of the diffraction. Additionally, the higher surface to volume ratio of smaller microspheres may also increase the ratio of surface chains to embedded ones and eventually change the overall diffracted color of the spheres. For microspheres larger than 10 μm, the embedded straight assemblies dominate and the bending of the surface assemblies is small, so that the microspheres show uniform colors.

The optical response of the microspheres to the external magnetic field was characterized by the switching threshold of field strength and switching frequency, which describe how strong of an external magnetic field is required to rotate the microspheres and how fast the microspheres respond to the changes in the magnetic field, respectively. First, a low concentration of microspheres dispersed in a density matched solvent—PEGDA liquid were used to measure the switching threshold. The dispersion was sandwiched between two hydrophobic glass slides to avoid adhesion to the glass substrate. With increasing magnetic field strength, the microspheres were gradually turned "on" and digital photos were taken after approximately 5 seconds of every change in the field strength.

Figure 11:
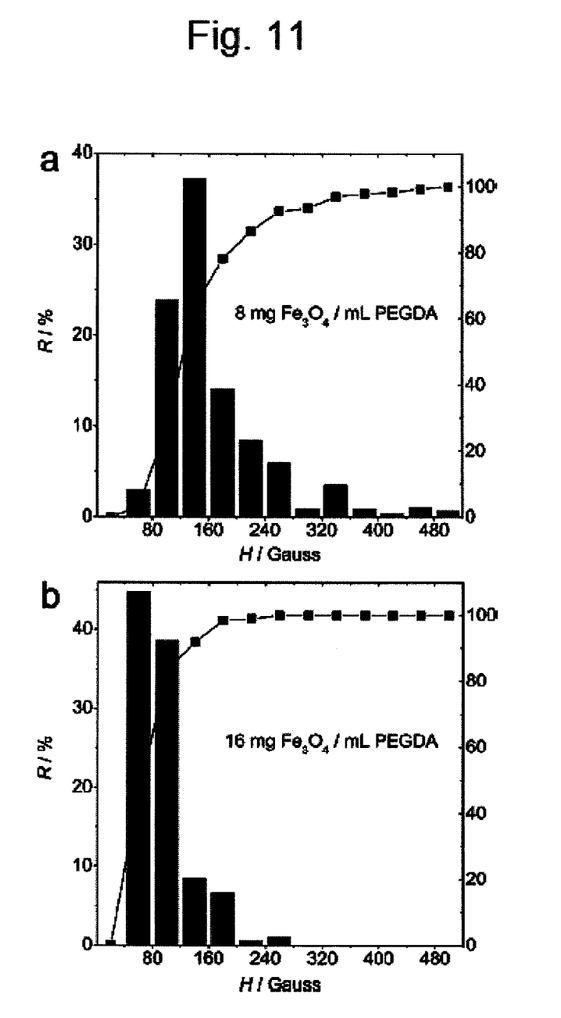
FIG. 11 illustrates statistical diagrams showing the turning threshold of field strength for $Fe_3O_4@SiO_2$/PEGDA microspheres with different loadings of magnetic particles, wherein FIG. 11(*a*) is 8 and FIG. 11(*b*) is 6 mg $Fe_3O_4$/ml PEGDA, and wherein the diagrams show the percentage of viewable area which is turned on at certain field strengths, and the corresponding accumulative curves.

FIG. 11 shows the statistic diagrams of the percentage of microspheres (counted in viewable area) that have been turned "on" in an increasing field for two samples with different loading of the magnetic materials. The corresponding accumulative curves are plotted from the diagrams. It has been found that the loading of the magnetic materials in the microspheres, and not the sphere size is one of the factors, which determines the switching threshold of the field strength. For microspheres with low magnetic loading (8 mg $Fe_3O_4$/mL PEGDA), 80% of them can be turned on in a magnetic field of approximately 180 Gauss, while for microspheres containing more superparamagnetic particles (16 mg $Fe_3O_4$/mL PEGDA), only a 100 Gauss magnetic field is required to turn on the numbers of spheres.

The switching of diffraction could be accomplished rapidly (i.e., less than approximately 1 second (<1 s)) in a sufficiently strong magnetic field. Turning frequency of the microspheres was measured with a test platform built with a halogen light source, a spectrometer and a rotating magnet unit with geared DC motor. The rotating plate with NS and SN magnets standing alternately will produce a periodical vertical (1100-1200 Gauss) and horizontal magnetic field (300, 400 Gauss), whose frequency can be simply controlled by the rotating speed of the plate.

Figure 12:
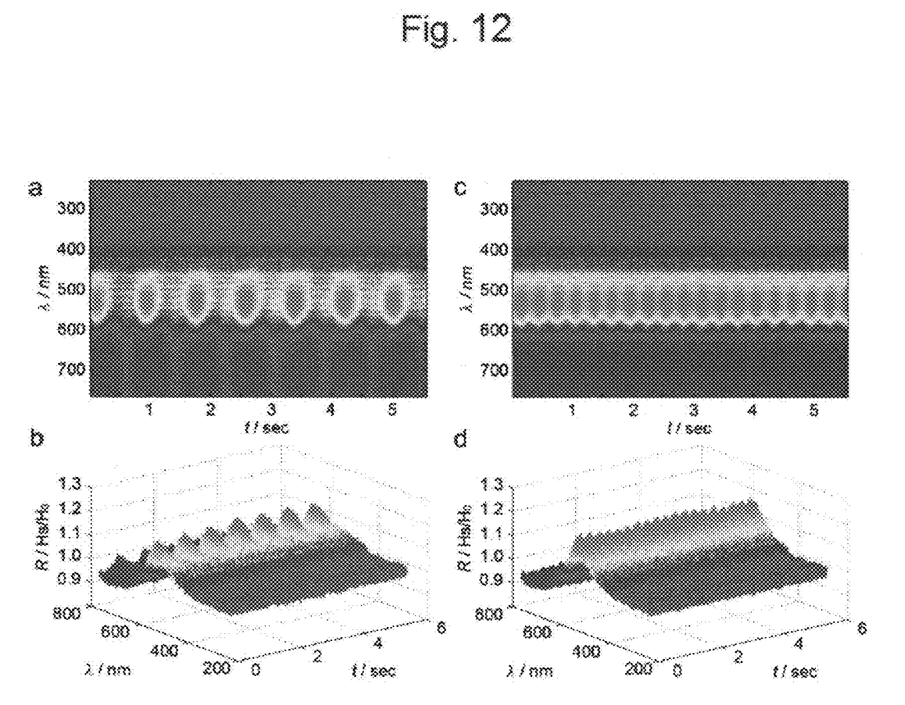
FIG. 12 illustrates schematic diagrams of the optical response of $Fe_3O_4@SiO_2$/PEGDA microspheres in a (a, b) 1.22 and (c, d) 3.33 Hz vertical/horizontal alternating magnetic field, wherein $H_s/H_0$ is the ratio of reflection with H field to that without H field.

FIG. 12 illustrates schematic diagrams of the optical response of $Fe_3O_4@SiO_2$/PEGDA microspheres in a (a, b) 1.22 and (c, d) 3.33 Hz vertical/horizontal alternating magnetic field, wherein $H_s/H_0$ is the ratio of reflection with H field to that without H field. FIG. 12 demonstrates that the photonic microspheres can be rotated quickly. It can be noted that the rotating amplitude gradually decreases with the increase of turning frequency, primarily due to the relatively weak horizontal field strength. In addition, it can be appreciated that when the frequency is higher than approximately 7 Hz, the rotation of microspheres cannot catch up with the external field variation so that they seem to simply vibrate around the vertical state and the diffraction remains on all the time. In accordance with an exemplary embodiment, the switching frequency can be further improved when the microspheres are dispersed in a less viscous solvent or tuned in magnetic fields with higher strengths.

In accordance with an exemplary embodiment, the incorporation of photonic crystals into microspheres allows tuning of the photonic property by simply controlling the sphere orientation, making it very convenient to create bistable states that are required for a plurality of applications such as displays. For example, a simple switchable color display system in which the color information can be rewritten multiple times by means of the magnetic field. The basic idea is to create bistable states by embedding the microspheres into a matrix that can be switched between liquid and solid states.

In accordance with an exemplary embodiment, long chain hydrocarbons and short chain polymers, such as paraffin and poly(ethylene glycol), have melting points slightly above room temperature. When heated, the matrix material melts, allowing the display of colors by aligning the microspheres using magnetic fields. When the system is cooled to room temperature, the matrix solidifies and the orientation of microspheres is frozen so that the color information remains for long time without the need of additional energy. It can be appreciated that an external magnetic field cannot alter their color once the orientation of microspheres is fixed by the matrix. Reheating the matrix materials, however, will erase the particular color by randomizing the orientation of the microspheres or by magnetically reorienting the microspheres to a completely "off" state.

Figure 13:
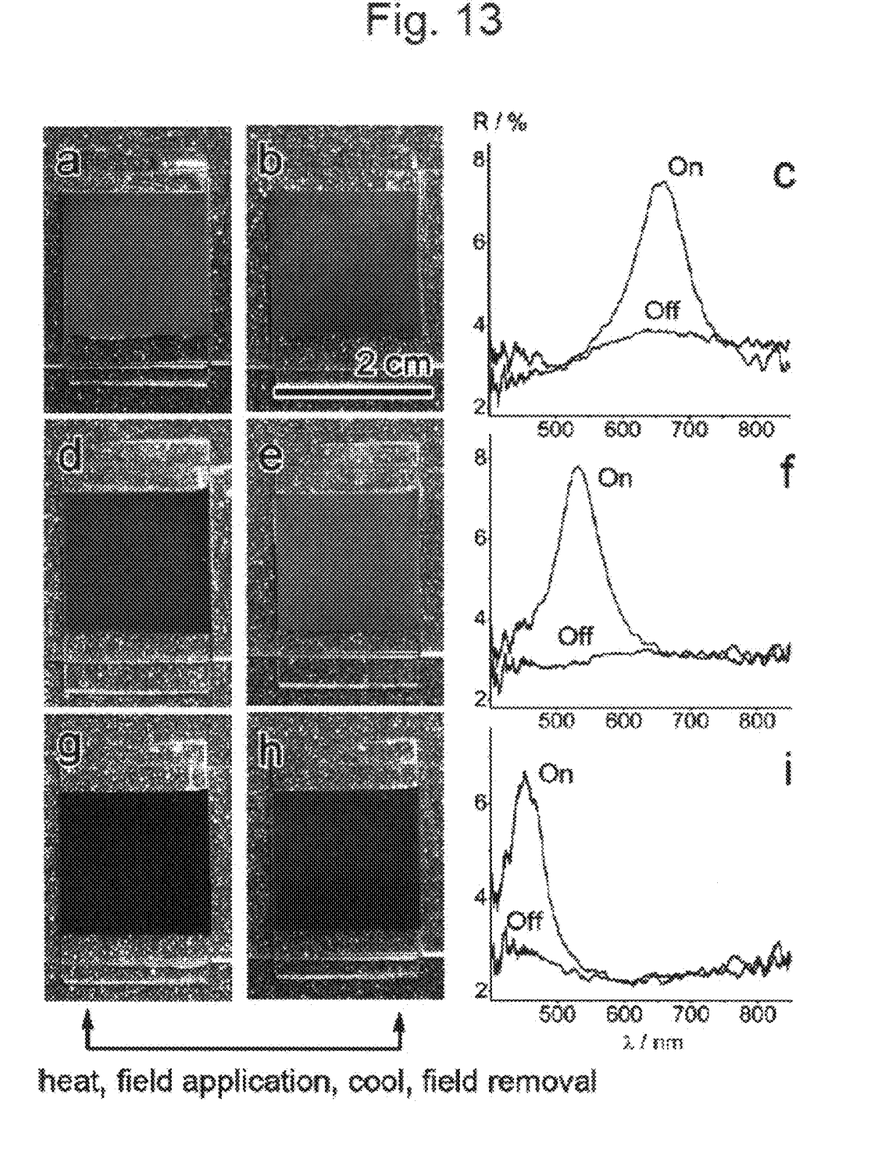
FIG. 13 illustrates digital photos and reflection spectra of three types of $Fe_3O_4@SiO_2$/PEGDA microspheres loaded in 1.8 cm×1.8 cm×0.1 cm glass cells filled with PEG (Mw=1500).

FIG. 13 shows three examples of such displays fabricated by embedding the microspheres in polyethylene glycol (PEG, Mw=1500) films, which can be melted at approximately 46° C. In FIG. 13, The diffraction is switched on (a, d, g) or off (b, e, h) by melting the PEG matrix, rotating the microspheres with a magnetic field, and finally cooling down the PEG matrix to lock the sphere orientation such that bistable states can therefore be maintained in the absence of magnetic fields, and the corresponding reflection spectra (c, f, i) display diffraction peaks at the "on" stage and none at the "off" stage. In (a, b, c), the superparamagnetic nanoparticles are in a size of 197 nm, and the microsphere particle is red. In (d, e, f), the superparamagnetic nanoparticles are in a size of 154 nm, and the microsphere particle is green. In (g, h, i), the superparamagnetic nanoparticles are in a size of 127 nm, and the microsphere particle is blue.

The comparison of digital photos and reflection spectra clearly demonstrates two stable diffractive states at room temperature, suggesting the possible applications of such systems as economical and rewritable color display units.

It can be appreciated that the magnetochromatic microspheres can be prepared through a simultaneous magnetic assembly and UV curing process in an emulsion system. In accordance with an exemplary embodiment, superparamagnetic $Fe_3O_4@SiO_2$ colloidal particles are self-organized into ordered structures inside emulsion droplets of UV curable resin, followed by an immediate UV curing process to polymerize the droplets and fix the ordered structures. In addition, it can be appreciated that by rotating the microspheres, the orientation of the magnetic chains can be controlled, and thereby exhibit the diffractive colors. In addition, a plurality of copies of the microspheres can be produced using the process, and can be tuned by external fields to collectively display uniform colors. The excellent stability, good compatibility with dispersion media, and the capability of fast on/off switching if the diffraction by magnetic fields, also make the system suitable for applications such as color displays, signage, bio- and chemical detection, and magnetic field sensing.

In accordance with an exemplary embodiment, as the size of the magnetic particle increases, the color red shifts (or the diffraction wavelength increases). As the thickness of silica coating increases, the color red shifts (or the diffraction wavelength increases). As the magnetic field strength increases, the color blue shifts (or the diffraction wavelength decreases). However, it can be appreciated that the color or the diffraction wavelength is determined by not only the magnetic particle size, the silica coating (or coating medium), and magnetic field strength, but also many other parameters such as the chemical nature of the resin, the surface charge of the particle surface, and the additives.

In accordance with an exemplary embodiment, the relation of the colors (Red, Green & Blue) to the three parameters (size of magnetic particle, thickness of silica coating, magnetic field strength) is as follows, as the overall size of $Fe_3O_4@SiO_2$ colloids increase from about 120 nm to 200 nm, the color shifts from blue to red. As the magnetic field strength increase, the color would blue shift.

In accordance with an exemplary embodiment, the magnetic field preferably is in the range of approximately 100 Gauss to approximately 400 Gauss. It can also be appreciated that the magnetic field strength required to rotate the microspheres is dependent on an amount of the magnetic particles in each of the microspheres. As the amount of magnetic content within a composite, which is defined as magnetic density, the more magnetic content, less magnetic field is required to rotate the microspheres.

In accordance with an exemplary embodiment, the method and systems as disclosed herein, microspheres can be incorporated into a display device wherein very small quanta of microspheres can be locally manipulated to change color or to create on-off color using an integrated micromagnetic actuator to produce local magnetic flux in the area from several to tens of micrometers.

In accordance with an exemplary embodiment, it can be appreciated that the ordered structures in the micromagnetospheres are composed of parallel 1D chains of magnetic particles, their spacing determined by the balance of the attractive and repulsive forces, which in turn are affected by the external magnetic field. In addition, it can be appreciated that the colors exhibited by the magnetic particles in solution, or fixed, are created by the ordered structures described above.

The foregoing is illustrative of the present disclosure and is not to be construed as limiting thereof. Although numerous embodiments of the present disclosure have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims. The present disclosure is defined by the following claims, with equivalents of the claims to be included therein.

What is claimed is:

1. A method of forming a microsphere having a structural color, the method comprising:
providing a composition for generating a structural color, the composition including a curable material and magnetic nanoparticles dispersed in the curable material;
adding the composition for generating a structural color to an immiscible solvent to form an emulsion including spherical droplets of the curable material dispersed in the immiscible solvent, each spherical droplet including the magnetic nanoparticles dispersed therein;
applying a magnetic field to the emulsion to align the magnetic nanoparticles located in each spherical droplet of the curable material in one-dimensional chain structures; and
curing the spherical droplets dispersed in the immiscible solvent while applying the magnetic field to the emulsion to i) fix the chain structures formed by the aligned magnetic nanoparticles in each spherical droplet and ii) form the microsphere which is cured and dispersed in the immiscible solvent, the microsphere including the fixed chain structures which are formed by the magnetic nanoparticles aligned and fixed in the cured material and having the structural color generated by a diffraction of light passing through the microsphere,
wherein the microsphere contains an ordered structure of a photonic crystal due to the alignment of the magnetic nanoparticles, and a diffraction angle of the light passing through the microsphere is changed with rotation of the microsphere.

2. The method according to claim 1, wherein the magnetic nanoparticles include a superparamagnetic material.

3. The method according to claim 1, wherein the magnetic nanoparticles have a structure coated with a shell layer surrounding a core formed in a cluster of magnetic nanocrystals.

4. The method according to claim 3, further comprising a solvation layer coating a surface of the magnetic nanoparticles.

5. The method according to claim 1, further comprising changing the structural color from a first color into a second color by changing a diffraction angle of the light passing through the microsphere by rotating the microsphere.

6. The method according to claim 5, wherein a magnetic field strength required to rotate the microsphere is dependent on an amount of the magnetic particles in the microsphere.

7. The method according to claim 1, further comprising dispersing a plurality of microspheres each having the structural color in a phase-changeable matrix.

8. The method according to claim 7, wherein when the phase-changeable matrix is in a liquid phase, adjusting an angle of the external magnetic field to change an orientation of the plurality of microspheres.

9. The method according to claim 8, wherein when the phase-changeable matrix is changed into a solid phase, the orientation of the plurality of microspheres is fixed.

10. The method according to claim 1, wherein the microsphere has an average diameter of approximately 1 to 300 µm.

11. A method of forming a microsphere having a structural color, the method comprising:
providing a composition for generating a structural color, the composition including a curable material and magnetic nanoparticles dispersed in the curable material;
adding the composition for generating a structural color to an immiscible solvent to form an emulsion including spherical droplets of the curable material dispersed in the immiscible solvent, each spherical droplet including the magnetic nanoparticles dispersed therein;
applying a magnetic field to the emulsion to align the magnetic nanoparticles located in each spherical droplet of the curable material in one-dimensional chain structures; and
curing the spherical droplets dispersed in the immiscible solvent while applying the magnetic field to the emulsion to i) fix the chain structures formed by the aligned magnetic nanoparticles in each spherical droplet and ii) form the microsphere which is cured and dispersed in the immiscible solvent, the microsphere including the fixed chain structures which are formed by the magnetic nanoparticles aligned and fixed in the cured material and having the structural color generated by a diffraction of light passing through the microsphere,
wherein the curable material is a monomer or oligomer containing a crosslinkable site.

12. A method of forming a microsphere having a structural color, the method comprising:
providing a composition for generating a structural color, the composition including a curable material and magnetic nanoparticles dispersed in the curable material;
adding the composition for generating a structural color to an immiscible solvent to form an emulsion including spherical droplets of the curable material dispersed in the immiscible solvent, each spherical droplet including the magnetic nanoparticles dispersed therein;
applying a magnetic field to the emulsion to align the magnetic nanoparticles located in each spherical droplet of the curable material in one-dimensional chain structures; and
curing the spherical droplets dispersed in the immiscible solvent while applying the magnetic field to the emulsion to i) fix the chain structures formed by the aligned magnetic nanoparticles in each spherical droplet and ii) form the microsphere which is cured and dispersed in the immiscible solvent, the microsphere including the fixed chain structures which are formed by the magnetic nanoparticles aligned and fixed in the cured material and having the structural color generated by a diffraction of light passing through the microsphere,
wherein the structural color is a function of an external magnetic field, a size of the magnetic nanoparticles and a shell thickness of the nanoparticles.

* * * * *